(12) United States Patent
D'Englere

(10) Patent No.: US 8,160,545 B2
(45) Date of Patent: Apr. 17, 2012

(54) PREMIUM SMS FOR PREPAID SERVICE

(75) Inventor: David D'Englere, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 635 days.

(21) Appl. No.: 12/334,003

(22) Filed: Dec. 12, 2008

(65) Prior Publication Data

US 2010/0151819 A1 Jun. 17, 2010

(51) Int. Cl.
*H04M 11/00* (2006.01)

(52) U.S. Cl. ........ 455/406; 455/405; 455/410; 455/411; 455/414.1; 455/466

(58) Field of Classification Search .................. 455/406, 455/405, 410, 411, 414.1, 466
See application file for complete search history.

(56) References Cited

U.S. PATENT DOCUMENTS

| 6,819,932 B2 * | 11/2004 | Allison et al. ................. 455/466 |
| 2003/0065615 A1 * | 4/2003 | Aschir ........................... 705/39 |

\* cited by examiner

*Primary Examiner* — Nghi Ly

(57) ABSTRACT

An exemplary system and method are directed at the selective delivery of communications messages. The selective delivery may comprise receiving a communications message from a network device; determining an identifier associated with the communications message; determining whether a subscriber is blocked from receiving the communications message based at least in part on the identifier; and selectively delivering the communications message to the subscriber based on the determination.

25 Claims, 6 Drawing Sheets

Billing ID Blocking

PREMIUM SMS FOR PREPAID SERVICE

BACKGROUND

A mobile phone subscriber may be charged a fee to send or receive a Short Message Service (SMS) message. Additionally, the subscriber may be charged an additional fee for a Premium SMS (PSMS) message. For a post-pay subscriber, these fees may accrue during and become due at the end of the billing cycle (e.g., monthly, quarterly, on a specific date, etc.). As a result, a post-pay subscriber is typically not required to have sufficient funds in an account (or on a phone card, etc.) at the time of message sending or delivery in order to pay for any SMS or Premium SMS charges that may be assessed.

However, a pre-pay mobile phone subscriber typically pays for service before use (e.g., through purchase of a prepaid phone card), and may not be subject to future billing. To facilitate payment of any SMS/PSMS charges from such a subscriber, the SMS/PSMS charges may be debited from the subscriber's account (e.g., from the subscriber's pre-paid phone card) at or near the time of SMS/PSMS message sending or delivery.

If insufficient funds remain in the pre-pay subscriber's account, then the sending or delivery of SMS/PSMS messages may be blocked. Additionally, SMS/PSMS messages may be blocked for both pre-pay and post-pay subscribers who have some or all SMS/PSMS services restricted.

DETAILED DESCRIPTION

Figure 1:
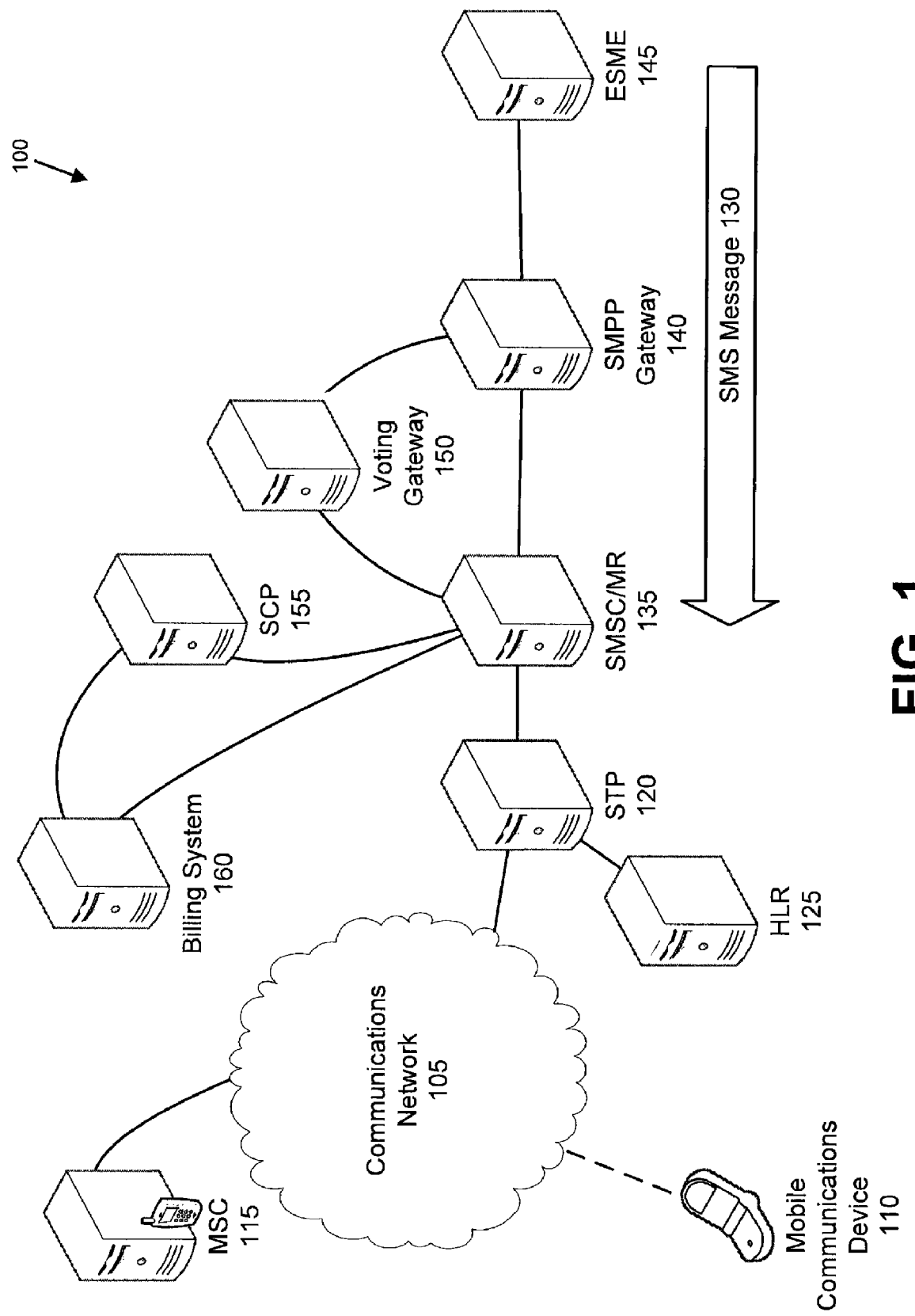
FIG. 1 illustrates an exemplary communications system for the selective delivery, blocking, and billing of Premium SMS messages.

FIG. 1 illustrates an exemplary communications system (system) 100 for the selective delivery, blocking, and billing of Premium SMS messages. System 100 may take many different forms and include multiple and/or alternate components and facilities. While an exemplary system 100 is shown in FIG. 1, the exemplary components illustrated in the figure are not intended to be limiting. Indeed, additional or alternative components and/or implementations may be used.

SMS is a messaging protocol that typically is used for the sending and receiving of Short Message Service messages to and from devices, including, for example, mobile communications devices 110. SMS messages 130 may also be sent and received by other devices, including wired devices such as an External Short Message Entity (ESME) 145 (discussed in detail below), or for example a desktop computer, as is well known. An SMS message 130 typically may contain up to 160 7-bit characters (or fewer characters in a larger bit encoding), and may include textual and binary data. Longer messages may be sent through the concatenation of multiple SMS messages 130.

Premium SMS messaging 130 describes a family of premium priced SMS messages 130 (e.g., news alerts, financial information, logos, ring tones, etc.) that are available to mobile subscribers and users of mobile communications devices 110. Premium SMS messages 130 may be categorized as Mobile Terminated and Mobile Originated. Mobile Terminated (MT) messages are messages delivered to a mobile communications device 110, and Mobile Originated (MO) messages are messages sent from a mobile communications device 110. Examples of MT Premium SMS messages 130 include news alerts, financial information, ring tones, and graphics for display on a mobile communications device such as logos and background images. Examples of MO Premium messaging include telephone voting messages (e.g., such as for voting for contestants on the television show "American Idol") that may be sent to, for example, a Voting Gateway 150 connected to a communications network 105.

Typically, subscribers who send or receive Premium SMS messages 130 incur an additional charge over and above the cost of a regular SMS message 130. The additional charge or charges for a Premium SMS message 130 may be revealed to the subscriber though an opt-in process. For example, before a Premium SMS message 130 is delivered, a subscriber may be presented with a fee amount for the Premium SMS message 130 to be delivered, and may accept or reject delivery of the Premium SMS message 130 based on the fee amount (e.g., whether the subscriber wishes to be billed the fee amount in order to receive the message). In further examples, a subscriber may opt-in and accept delivery of one or more Premium SMS messages 130 in addition to the current message, such as an opt-in to receive daily news updates through a stream of SMS messages 130. In still other examples, once a subscriber opts-in for delivery of a particular type of Premium SMS message 130 then all future messages of that particular type may be automatically delivered.

PSMS messages 130 may be charged at various rates, including subscription periods (e.g., daily, weekly, monthly, annual or other event periods), and/or per-event charges. With regard to subscription messages, the Premium offerings may be based on subscription period SMS subscriptions, or may be charged on a per message bases for Premium SMS message 130 programs.

The total cost of a Premium SMS message 130 may include both the cost of transport/fees for a standard SMS text message rate, as well as an additional fee amount associated with each Premium SMS message 130. The cost of a Premium SMS message 130 may also vary from message to message (e.g., Premium SMS messages 130 returned from different short code requests may be associated with different billing rates).

For a post-pay subscriber, additional charges for SMS or Premium SMS messages 130 may be included as part of the subscriber's bill. For a pre-pay subscriber, the system 100 may allow for the charging of fees for SMS/PSMS messages 130 at or near the time the SMS/PSMS messages 130 are sent or delivered.

Moreover, the system 100 may also allow for PSMS messages 130 to be blocked for pre-pay and post-pay subscribers. As an example, premium SMS messages 130 may be blocked for pre-pay subscribers who have insufficient funds remaining in their accounts to pay for the cost of a Premium SMS message 130. As a further example, a subscriber may elect to block some or all Premium SMS services by subscription agreement. As yet another example, a service reseller may elect to have some or all Premium SMS messaging features blocked for its subscribers, limiting the reseller's liability to Premium SMS charges for premium services requested by the reseller's subscribers.

The system 100 may require that a pre-pay platform be informed of the cost of PSMS messages 130 (including or in addition to the cost of an SMS message 130 itself) to allow the platform to property debit a pre-pay subscriber's account. For example the pre-pay platform may accept a direct feed or feeds from each of the premium providers/aggregators of PSMS services. The pre-pay platform may use information from these feeds to aid in calculating fees for a Premium SMS message 130. The fees may also vary based on additional factors, including a subscriber's calling plan, a feature code, an identifier, a subscriber account, a message type, a time of day (e.g., a time the message was sent, a time the message was delivered), etc.

In any event, these fees may be used to charge the pre-pay subscriber an appropriate billed amount, and also to decrement the pre-pay subscriber's card the appropriate amount for that particular service. If the pre-pay subscriber's card or account has inadequate value remaining (i.e., the account balance is less than the fee amount), or falls below a threshold value (e.g., below zero, below $1.00, etc.), the pre-pay system may prevent the pre-pay subscriber from utilizing the service prior to its use (e.g., blocking message delivery).

As illustrated in FIG. 1, in an exemplary approach system 100 includes a mobile communications device 110. A mobile communications device 110 or other communications device (e.g., Plain Old Telephone Service (POTS) telephone, Voice Over Internet Protocol (VOIP) telephone, mobile telephone, "softphone," pager, computer, Set Top Box (STB), etc.) is used by a subscriber to send and receive communications (e.g., voice, text, binary data etc.) on a communications network 105 (e.g., Public Switched Telephone Network (PSTN), VOIP, cellular telephone, etc.). Likewise, a communications network 105 may provide communications services, including voice calling, packet-switched network services (e.g., Internet access and/or VOIP communication services), as well as SMS messaging and Premium SMS messaging services, to at least one mobile communications device 110.

A Mobile Switching Center (MSC) 115 is a service node of a phone communications network 105 (e.g., a Code Division Multiple Access (CDMA) mobile telephone network) which may maintain connections to a plurality of mobile communications devices 110, as is well known. Although only one mobile communications device 110 is shown in FIG. 1, a plurality of mobile communications devices may be connected to at least one MSC 115, e.g., via communications network 105.

The system may store a list of connected mobile communications devices 110 (e.g., through the aid of Home Location Register (HLR) 125), and use the list to support tasks including delivery of services such as PSMS to pre-pay or post-pay subscribers connected to or under the jurisdiction of the MSC 115. The MSC 115 may provide services including the connection of outgoing calls to other mobile subscribers, to auto-attendants, and to external networks including the PSTN.

The MSC 115 may arrange and implement handovers from one MSC 115 to another, for example if a mobile communications device 110 moves from the jurisdiction of one MSC 115 to another MSC. FIG. 1 shows only one MSC 115 for clarity. Thus, one or more MSCs 115 may provide communication functionality for mobile communications device 110, such as transmitting telephone calls to and from mobile communications devices 110, as is known. An MSC 115 may also support supplementary services such as conference calls or call holding, and generating billing or call information based on services rendered.

The MSC 115 may further provide services to handle the delivery of SMS messages 130 and PSMS messages 130 from subscribers (i.e., both pre-pay and post-pay) to a Short Message Service Center/Message Register (SMSCAMR) 135, usually through a Signal Transfer Point (STP) 120. The MSC 115 may additionally provide for the delivery of SMS messages 130 and PSMS messages 130 from an SMSC/MR 135 to a subscriber, usually though an STP 120.

An STP 120 may be a router that may relay messages (e.g., SS7 messages, SMS messages 130, etc.) between other STPs 120 as well to other devices, such as an SMSC/MR 135. The STP 120 may route messages based on an address field in the message, or through analysis of the message body itself. In any event, an STP 120 may route messages between an MSC 115 and an SMSCAMR 135.

An SMSC/MR 135 generally provides store-and-forward functionality for SMS and PSMS messages 130. The SMSC/MR 135 may generally include one or more specialized computers to transmit SMS text messages to a plurality of mobile communications devices 110. SMSC/MR 135 may be in communication with at least one MSC 115 for the transmission of a SMS text messages to a mobile communications device 110, as is well known.

In many examples, the SMSC/MR 135 is a computing device, including a processor, and storage. In general, a processor (e.g., a microprocessor) receives instructions, e.g., from a memory, a computer-readable medium, etc., and executes these instructions, thereby performing one or more processes, including one or more of the processes described herein. Such instructions may be stored and transmitted using a variety of known computer-readable media.

In some examples, a SMSC/MR 135 may be implemented as computer-readable instructions (e.g., software) on one or more computing devices (e.g., servers, personal computers, etc.).

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Transmission media may include or convey acoustic waves, light waves, and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In any event, each SMSCAMR 135 is generally associated with one or more towers or MSCs 115, and each SMSC/MR 135 generally simultaneously (or nearly simultaneously) handles SMS messaging for a plurality of mobile communications devices 110. Handling SMS messaging may include monitoring all SMS communications and tracking the location of each mobile communications device 110.

In addition to monitoring SMS messages 130, an SMSCAMR 135 may selectively block SMS messages 130, including Premium SMS messages 130. For example, the SMSC/MR 135 may be connected to one or more billing systems (e.g., Billing System 160). When the SMSC/MR 135 receives a Premium SMS message 130 (e.g., from ESME 145), the SMSC/MR 135 may selectively block the Premium SMS message 130 based on criteria including the message data and the subscriber's account information. The SMSC/MR 135 may access a subscriber's account information through Billing System 160, for example, based on a Mobile Dialing Number (MDN) for the originating phone number included in the Premium SMS message 130. Blocking of SMS /Premium SMS messages 130 is discussed in more detail below with regard to FIGS. 3 through 6.

The SMSC/MR 135 may then determine if a subscriber's pre-pay account contains enough value (e.g., money) to pay for the Premium SMS message 130 (e.g., based on an ID included in or associated with the Premium SMS message 130). If the account contains insufficient funds, the SMSC/MR 135 may drop the message and instruct the ESME 145 of the error (e.g., through returning an error code indicating insufficient funds, blocked service, etc.). Otherwise, the SMSC/MR 135 may instruct Billing System 160 to debit the subscriber's account. If the debit is successful, then the SMSC/MR 135 may allow the Premium SMS message 130 through. In other examples, the message may be allowed as the debit is attempted without waiting for the debit operation to complete.

In further examples, the SMSC/MR 135 may selectively block messages based on whether an ID included in the Premium SMS message 130 is on a list of blocked IDs for a subscriber, based on whether a subscriber's MDN is on a list of blocked MDNs, etc.

A Short Message Peer to Peer (SMPP) Gateway 140 is an application or network entity that may be configured to selectively pass messages and requests between at least one mobile communications device 110 and the appropriate at least one ESME 145. Generally, the SMPP protocol allows Short Message Entities (SMEs) such as mobile communications devices 110 and ESMEs 145 to communicate and interface with devices such as SMSC/MR 135. The SMPP protocol defines both the messages (e.g., deliver_sm, submit_sm, etc.) to send between SMSCs and SMEs, as well as the format and specifics of the message data to be sent to allow for the sending and delivery of SMS messages 130. An exemplary SMS message is discussed below with regard to FIG. 2.

An External Short Message Entity (ESME) 145 is an application or network entity that selectively connects to at least one SMSC/MR 135 (either directly or via one or more SMPP Gateways 140) to engage in the sending and/or receiving of SMS and PSMS messages 130. In contrast to mobile communications devices 110, an ESME 145 is typically a wired device (e.g., over Internet Protocol (IP)/X.25), and not a wireless device. For example, an ESME 145 may send automated marketing SMS messages 130 to mobile communications devices 110. As a further example, an ESME 145 may also receive messages from mobile communications devices 110 (e.g., SMS messages 130, short codes, etc.), and respond to the subscriber messages with PSMS messages 130 (e.g., ring tones, news alerts, etc.).

Each mobile communications device 110 on the communications network 105 may have its own unique device identifier (e.g., telephone number, Common Language Location Identifier (CLLI) code, Internet Protocol (IP) address, input string, etc.) which may be used to indicate, reference, or selectively send and receive communications with a particular device on the communications network 105. Similarly, each ESME 145 may be accessed through a unique identifier.

Additionally, an ESME 145 may also be accessed through the use of at least one short code, as is well known. A short code is a special telephone number that is significantly shorter than a full telephone numbers. Short codes typically comprise three (3) digits for carrier specific codes and five (5) to six (6) digits for general codes available across different carrier networks. Similar to the manner in which a full phone number may be used to address an SMS message 130, a short code may be used to address SMS and Premium SMS messages 130 as well. A short code may have the advantage of being easier for a subscriber to remember or to dial than a full phone number.

In any event, an ESME 145 may be configured to send Premium SMS messages 130 to a plurality of subscribers. Additionally, ESME 145 may perform different services, or respond with different Premium SMS messages 130, based at least in part on the short code used. An ESME 145 may be configured to receive SMPP messages (e.g., deliver_sm), and to send SMPP messages (e.g., submit_sm) in order to handle requests from mobile communications devices 110 for Premium SMS messages 130.

A Voting Gateway 150 is an application or network entity that may process Premium SMS messages 130 that represent votes (e.g., such as to allow for audience voting for television programming such as for "American Idol," "Big Brother" etc.). The Voting Gateway 150 may be in selective communication with an SMSC/MR 135 as well as an SMPP Gateway 140 in order to support these Premium SMS services.

A Billing System 160 (e.g., SurePay) may handle billing and billing information based on the subscriber and services rendered. The Billing System 160 may be connected to an SMSC/MR 135 either directly or indirectly such as for example, through a Service Control Point (SCP) 155. An SCP 155 (e.g., eCS distributed by Lucent Technologies) may control services and communication with intelligent peripherals in a communications system. An SCP 155 may further hold prepaid subscribers data (including for example number, balance, price plan, etc.). The Billing System 160 may, for example, allow the SMSC/MR 135 to access account information. Additionally, the Billing System 160 may maintain records of sent Premium SMS messages 130 (e.g., what type, at what cost, or at what time) to allow for detailed billing and customer service (e.g., inquiries about charges).

The Billing System 160 may further include information regarding what features and services are supported, blocked, etc. on a subscriber account. Merely by way of example, a service (e.g., a Premium SMS service) may be represented as a feature code, and a feature code may be created to indicate the blocking of Premium SMS messages 130 associated with the service. For example, customer care may enter or associate such a feature code for a subscriber account into the Billing System 160, and thereby provision PSMS blocking services on an associated subscriber account. The Billing System 160 may further be in selective communication with other network devices (e.g., SMSCAMR 135, Voting Gateway 150, etc.) to provide them with information regarding the feature code, including whether SMS/PSMS messages 130 or other premium messaging services are blocked for a subscriber.

Figure 2:
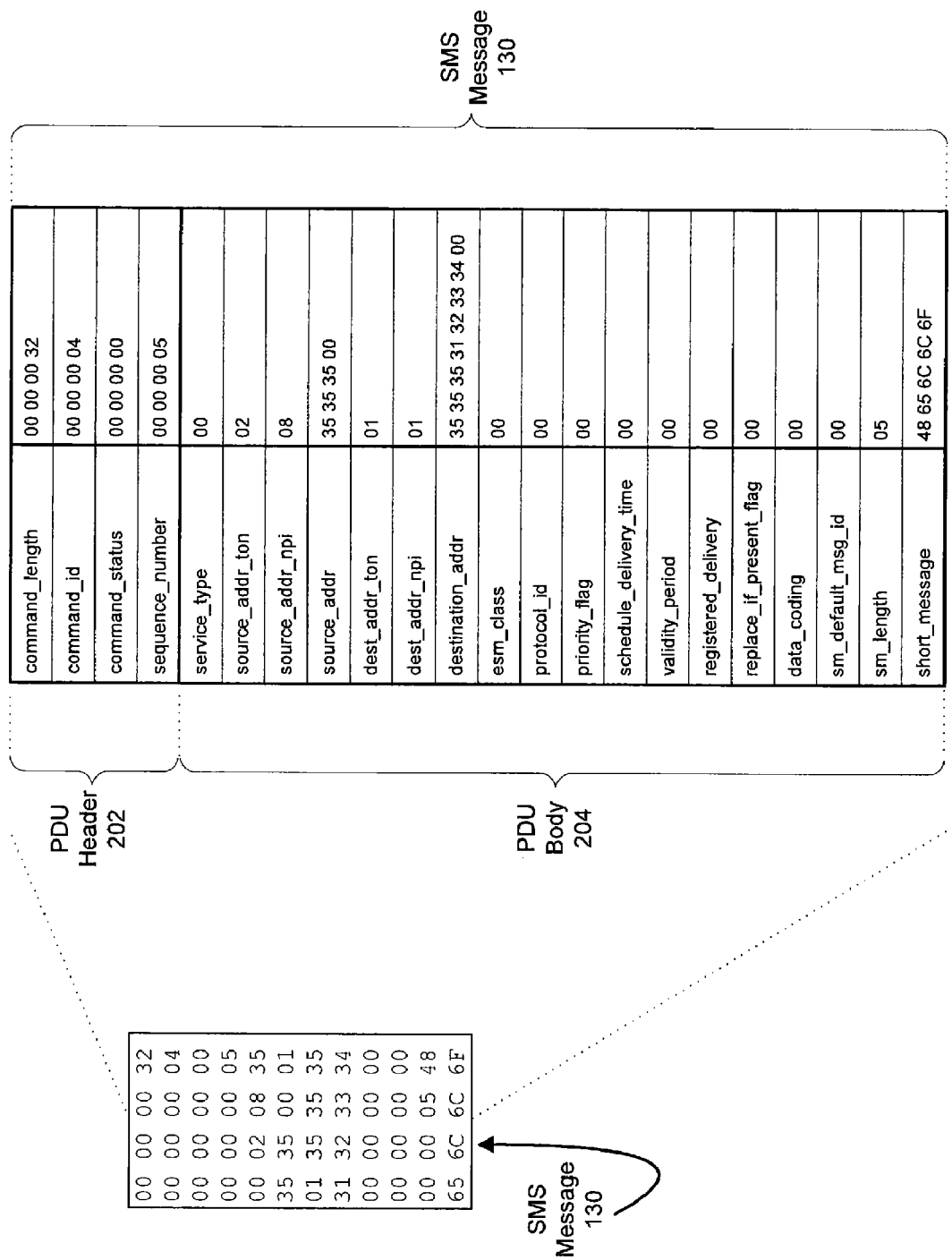
FIG. 2 illustrates an exemplary diagram of an SMS message.

FIG. 2 illustrates an exemplary diagram of an SMS message 130. As illustrated, the SMS message 130 in FIG. 2 is of type 'sm_submit' and is sent from source address '555' to destination address '555-1234', and includes a short message of 'Hello'.

Generally, an SMS message 130 includes a Protocol Data Unit (PDU) Header 202 and a PDU Body 204. The PDU Header 202 is usually mandatory for SMS messages 130, and includes a command length, a command ID, a command status, and a sequence number. The command length stores a number indicating the total size of the SMS message 130. The command ID indicates what particular command the SMS message 130 may represent (e.g., submit_sm, query_sm, deliver_sm, etc.) The command status may indicate a success or failure code for a response, or may be NULL for a request. The sequence number may include a number for use in correlating or associating multiple SMS messages 130 together.

The PDU Body 204 may be optional or mandatory, and the fields so contained may vary based on the command ID indicated in the PDU Header 202. Typically, each command may identify its own fields for use in a PDU Body 204. For example, as illustrated in FIG. 2, the command ID field in the PDU Header 202 indicates that this is a submit_sm message, and the mandatory PDU Body 204 fields are thus shown in the PDU Body 204.

The PDU Body 204 fields for a submit_sm message include for example, a source address field (source_addr), which may indicate the source address (e.g., '555') of a network device (e.g., a mobile communications device 110, an ESME 145 from which the message was sent, etc.). The PDU Body fields for sm_submit further include a destination address field (destination_addr), which may indicate a destination address (e.g., '555-1234') of the destination device (e.g., a mobile communications device 110, Voting Gateway 150, etc.) for the SMS message 130. The PDU Body 204 fields for sm_submit further include message data (short_message) along with message length (sm_length). In this example the message length is '5', and the message is 'Hello', encoded in American Standard Code for Information Interchange (ASCII) format. Other encodings for message data may be used as well, as is well known.

Moreover, optional parameters may also be included in a PDU Body 204. These may appear at the end of the PDU Body 204, and may include additional information. For example, a Billing ID field and/or feature code field may be included as an optional parameter. The optional field or fields may include a code to be used, for example, to aid in determining a fee amount for the SMS message 130 being sent. The optional parameter may include a parameter tag field indicating that the parameter is a billing ID (e.g., within a 2 octet integer tab), a length field indicating the length of the value (e.g., 4 octets), and a value (e.g., a 4 octet integer) indicating the Billing ID. In other examples, a Billing ID field may be included using different data types or lengths, as a required parameter and not an optional parameter, or otherwise sent or included with an SMPP or other type of message.

Figure 3:
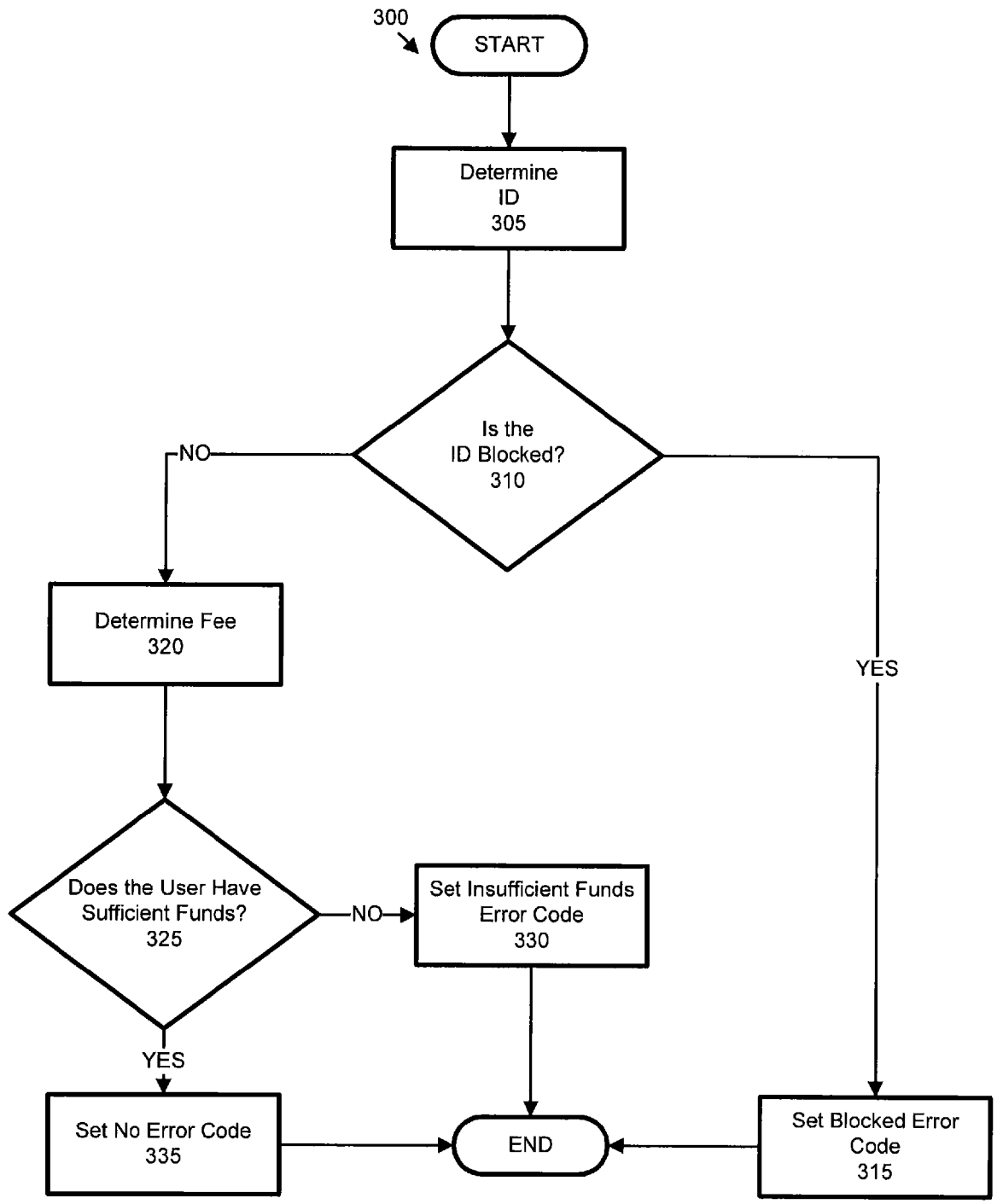
FIG. 3 illustrates an exemplary process for determining whether to deliver or block a Premium SMS message.

FIG. 3 illustrates an exemplary process 300 for determining whether to deliver or block a Premium SMS message 130. Additionally, the process 300 may further determine an error code indicating a reason for blocking the message. For example, an SMSC/MR 135 may selectively block SMS messages 130, including Premium SMS messages 130, using the exemplary process 300.

In step 305, an ID included in or otherwise associated with an SMS message is determined. For example, an SMSC/MR 135 may receive an SMS message 130 intended for a mobile communications device 110. The SMS message 130 may be received directly from an ESME 145, indirectly from an ESME 145 (e.g., through SMPP Gateway 140), from another mobile communications device 110, or from some other source. The SMS message 130 may include an ID, (e.g., MDN, destination address field of PDU, etc.) to which the message is intended to be delivered, an ID from which the message was requested or sent (e.g., MDN, source address field of PDU), an ID of a network device from which the message was generated or through which the message passed, a feature code, a billing ID, etc. The SMSC/MR 135 may use at least one ID to base at least part of a determination of whether or not to block an SMS message 130.

In some examples, a Billing ID, feature code, etc. may be included in a Premium SMS message 130 received by an SMSC/MR 135. The Billing ID, feature code, etc. may have been initially included in a Premium SMS message 130, such as a message generated by an ESME 145, in response to a short code received from a mobile communications device 110. If no Billing ID is included within the message, then a default Billing ID may be specified, for example, a default specified by the ESME 145.

In further examples, a ID may be determined based at least in part on a type code included in the Premium SMS message 130, the time of day the Premium SMS message 130 is sent, the location or device (e.g., point code, MSC 115, ESME 145, etc.) from which the Premium SMS message 130 was sent or is intended to be delivered. Moreover, an ID may be determined from a plurality of any of the IDs included in or associated with the Premium SMS message 130.

In any event, an ID is determined, and this ID may be used to determine if SMS messages 130 corresponding to or associated with the ID are blocked from SMS message delivery.

Next, in step 310, it may be determined whether SMS messaging has been blocked. If the subscriber is blocked from accessing SMS services for any reason (e.g., insufficient funds, blocked by a service reseller, blocked by an accountholder, etc.), then the subscriber may be blocked from receiving SMS message 130. Likewise, if a subscriber is blocked from accessing SMS services generally, the subscriber may also be blocked from any Premium SMS service as well. Alternately, the subscriber may be blocked from at least one Premium SMS service, while still maintaining access to other Premium SMS services or SMS messaging generally.

The determination whether to block an SMS message 130 may be based at least in part on the ID determined in step 305. For example, an SMSC/MR 135 may use the ID determined in step 305, and compare it against a list of blocked IDs received from Billing System 160.

The SMSC/MR 135 may further use an identifier as determined above in step 305, (e.g., MDN, etc.) to access subscriber account information. Subscriber account information may include for example, feature codes, account balance, or any other account information that may be used to determine whether the user has PSMS/SMS messaging enabled or blocked. Using the subscriber account information, a network or other device (e.g., SMSC/MR 135, Voting Gateway 150, Billing System 160, etc.) may determine whether the subscriber has been blocked or has chosen to be blocked from the delivery of SMS messages 130.

In some examples, the SMSC/MR 135 may determine whether an included ID, is within a blocked ID range. The blocked ID ranges may include a range of specific values to block or allow (e.g., 7000-7100), a single ID to block or allow (e.g., 5558), or a range including wildcard values (e.g., 72??, 724?) wherein the wildcard may match any one value (e.g., 0-9) within an ID. Additionally, Blocked ID ranges of various types may be combined together to create a list of blocked ID ranges (e.g., "6245,7200-7299,7???,7100-7200").

For example, a blocked Billing ID range or feature code for a subscriber or group of subscribers may be stored on the SMSC/MR 135 (e.g., in a Class of Service associated with pre-pay or post-pay subscribers, indexed by MDN, etc.). In further examples, a Billing ID range or feature code may be retrieved from a Metropolitan Trading Area (MTA) connected to the SMSC/MR 135, retrieved from a Billing System 160, etc. In still further examples, a Billing ID may be sent to a Billing System 160, where the Billing System 160 may perform a lookup of the Billing ID in a table, list, etc. of blocked ID ranges.

The lookup may further be performed based on a subscriber ID (e.g., MDN, etc.) corresponding to the mobile communications device 110 to which the Premium SMS message 130 may be delivered.

Moreover, other information, such as the MDN, the contents of the SMS message 130, the time of day, service provider, network traffic indication, etc. may be used instead of or in addition to ID, feature code, and subscriber account information as a basis for determining whether SMS messaging is blocked.

With regard to blocking based on ID, if the ID is within a blocked ID range (e.g., a blacklist), then the message may be blocked. In other examples, the determination whether or not to block an SMS message 130 may be based on whether an ID is within an unblocked range (e.g., a whitelist), on a list of individual blocked IDs (e.g., single IDs in addition to or instead of at least one range of IDs), on a list of blocked services associated with a list of IDs, in response to a blocked short code request to an ESME 145, etc.

In any event, if the SMS message 130 has been blocked, step 315 is executed next. Otherwise, step 320 is executed next.

In step 320, a fee amount may be determined. The fee amount may be charged to the subscriber for the sending, requesting or delivery of an SMS/PSMS message 130. This fee amount may be determined by an SMSC/MR 135 based at least in part on an ID (e.g., billing ID, MDN included in or associated with the SMS message 130, feature code, etc.). For example, a Billing ID may be sent from SMSC/MR 135 to Billing System 160, which may query a billing information table and return a value or fee amount indicating the charge associated with the specified Billing ID. In other examples, the fee amount may be determined based on additional information, including a subscriber ID, an MDN of a mobile communications device 110, a value included within the Premium SMS message 130, the time of day, the location of the mobile communications device 110, etc.

Additionally, the cost of an SMS message 130 itself, without regard to any Premium SMS service, may be included in the fee amount as determined (e.g., by the SMSC/MR 135) for the Premium SMS message 130. For example, a subscriber may be charged a fee amount (e.g., a flat fee amount of $0.15 per message received, a fee amount of $0.45 for any message over 10 received in a week, etc.) for SMS messages 130. This SMS message fee amount may be included within or added onto any fee amount determined for the Premium SMS message 130. In other examples, no SMS fee amount may be added onto the fee amount determined for the Premium SMS message 130. In further examples, a Billing ID may further indicate that the message is a fully "free-of-charge" SMS message 130, and therefore that the message should be sent, received, delivered, etc., without charge.

Next, in step 325, it may be determined whether the subscriber has sufficient funds to have the Premium SMS message 130 delivered. For example, a subscriber's account may be accessed through Billing System 160 (e.g., by SMSC/MR 135, by Billing System 160 itself, etc.), such as based on a Mobile Dialing Number (MDN) for the originating phone number included in the Premium SMS message 130, e.g., in the source address field of the PDU Body 204. The amount remaining in the subscriber account (e.g., money remaining on pre-paid phone card) may be compared to the cost of the Premium SMS message 130, for example as determined above with regard to step 320. If the subscriber account contains sufficient funds, otherwise indicates adequate value (e.g., allowance of a predetermined number of Premium SMS messages 130, etc.), then step 335 is executed next. Otherwise, step 330 is executed next.

In step 335, no error code is set. For example, the system may set a flag, or return a success code, or perform no action to indicate that the Premium SMS message 130 is not to be blocked. Then, the process 300 ends.

In step 330, an error may be set to indicate insufficient funds, meaning that the Premium SMS message 130 is to be blocked. The error code may be returned to the ESME 145 from the SMSC/MR 135 so that the ESME 145 may generate an SMS message 130 indicating the error. This SMS message 130 including the error may be delivered to a mobile communications device 110 (e.g., via. SMPP Gateway 140, SMSC/MR 135, and MSC 115). In this way, if a subscriber uses a mobile communications device 110 in order to request a Premium SMS message 130, and that message is then blocked, the subscriber may be informed that the message was blocked. In further examples, a specific error code indicating a lack of funds may be returned to the ESME 145 so that the subscriber may be informed of a reason why the message was in fact blocked. In still further examples, the ESME 145 may be informed of the amount of the shortfall, which again may be indicated to the subscriber. In still other examples, the ESME 145 may return a generic error code. Alternately, an error code or error message may be returned to a mobile communications device 110 without the use of ESME 145, for example from SMSCAMR 135 to mobile communications device 110 via. MSC 115. Then, the process 300 ends.

In step 315, an error is set to indicate the ID associated with the Premium SMS message 130 is on a list of blocked IDs, and therefore that the Premium SMS message 130 is to be blocked. For example, an error code indicating that the SMSC/MR 135 has determined that the ID is to be blocked may be returned to the ESME 145, to a mobile communications device 110 (e.g., via. SMPP Gateway 140, SMSC/MR 135, and MSC 115), etc., as discussed above with regard to step 240. In further examples, specific error codes may be returned to indicate a reason that the ID is blocked (e.g., Premium SMS disabled by a service reseller, the subscriber's account is past-due, etc.). In still other examples, ESME 145 or SMSC/MR 135 may return a generic error code. Then, the process 300 ends.

Figure 4:
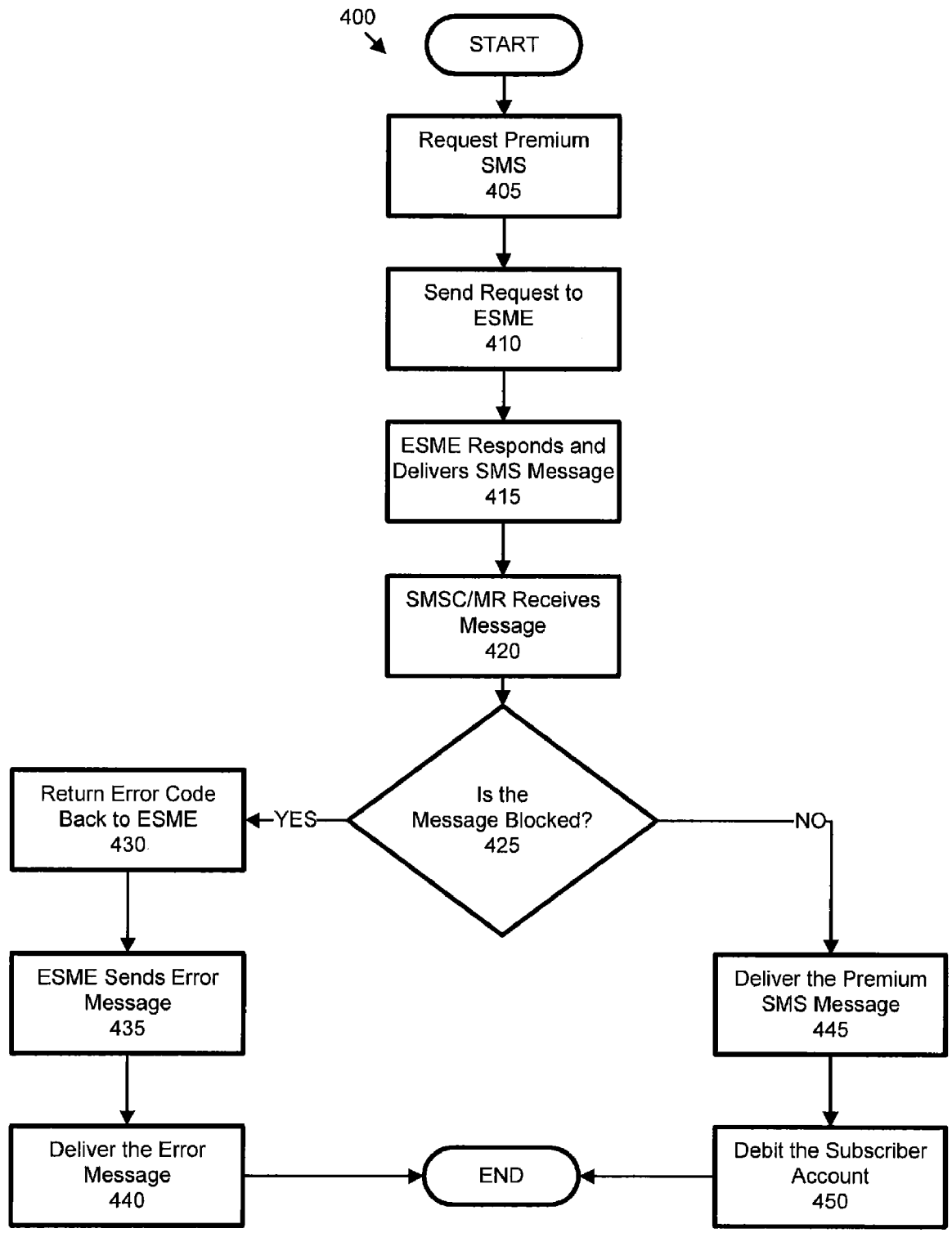
FIG. 4 illustrates an exemplary process for opt-in blocking of Premium SMS messages.

FIG. 4 illustrates an exemplary process 400 for opt-in blocking of Premium SMS messages 130.

In step 405, a request for a Premium SMS program may be received. For example, a request may be sent as a short code (e.g., "59595") dialed into a mobile communications device 110.

Next, in step 410, the request may be sent to an ESME 145. For example, the request from mobile communications device 110 may be received by a MSC 115, and forwarded through SMSC/MR 135 and SMPP Gateway 140 to ESME 145. In other examples, the request may bypass either the SMSC/MR 135 or the SMPP Gateway 140. In further examples, one or more of these network devices may be combined into one or more devices, and/or the request may be sent through additional network devices.

Next, in step 415, the ESME 145 may respond and fulfill the request to create a Premium SMS message 130 according to the request. The Premium SMS message 130 may include or be associated with an ID, where the ID represents, includes or is associated with a fee amount to be charged for the Premium SMS message 130.

Next, in step 420, the Premium SMS message 130 may be received by the SMSC/MR 135.

Next, in step 425, it may be determined if the Premium SMS message 130 is blocked. For example, the SMSC/MR 135 may perform a process similar to the one described above with regard to FIG. 3 in order to determine whether or not to block the received Premium SMS message 130. If the message should be blocked, step 430 is executed next. Otherwise, step 445 is executed.

In step 430, an error code is returned back to the ESME 145. As mentioned above with regard to FIG. 3, an error code may indicate a reason for the blocking of the Premium SMS message 130. This error code may then be sent back to the ESME 145. In further examples, a generic error code indicating that the Premium SMS message 130 was blocked may be returned.

Next, in step 435, the ESME 145 may send an error message. For example, the ESME 145 may generate an SMS message 130 (typically not a Premium SMS message 130, as Premium SMS messaging may be blocked, e.g., blocked by SMSC/MR 135). In many examples, the error message may be sent to the subscriber for no charge, but in further examples, a fee amount may be assessed for the sending or delivery of the error message.

Next, in step 440, the error message is delivered. For example, the error message may be delivered to a mobile communications device 110. Then, the process 400 ends.

In step 445, the Premium SMS message 130 may be delivered. For example, the Premium SMS message 130 as requested may be delivered to the mobile communications device 110 that initially sent the request.

Next, in step 450, the subscriber account may be debited the fee amount for the Premium SMS message 130. The fee amount may be determined, for example, as discussed above with regard to step 350 of FIG. 3. The system 100 may delay the debit of a fee amount for the Premium SMS message 130 until the message is received, or alternately, the system 100 may delay the delivery of the message until the fee amount is debited (i.e., perform step 450 before step 445). In further examples, the system 100 may debit the fee amount for the Premium SMS message 130 without regard to whether the message was in fact received. Then, the process 400 ends.

Figure 5:
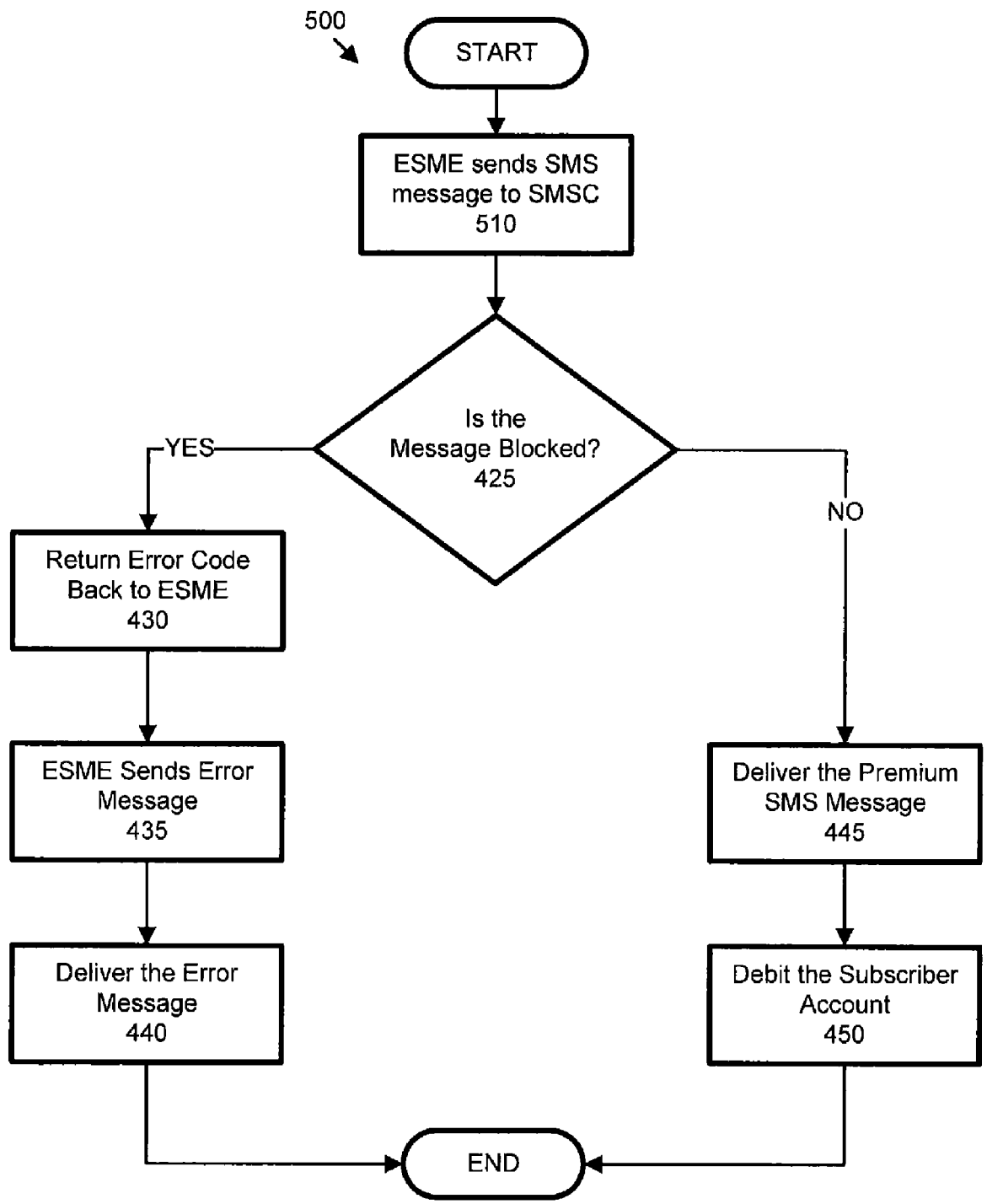
FIG. 5 illustrates an exemplary process for mobile terminate blocking of Premium SMS messages.

FIG. 5 illustrates an exemplary process for mobile terminate blocking of Premium SMS messages 130.

In step 510, an ESME 145 may send a Premium SMS message 130 to an SMSC/MR 135. For example, a Premium SMS message 130 may be sent without regard to any subscriber request (e.g., an unsolicited advertisement). As another example, a Premium SMS message 130 may also be automatically sent as part of a message subscription (e.g., news alerts).

Next, step 425 may be executed. The remaining steps of process 500 are similar to as described above with regard to process 400.

Figure 6:
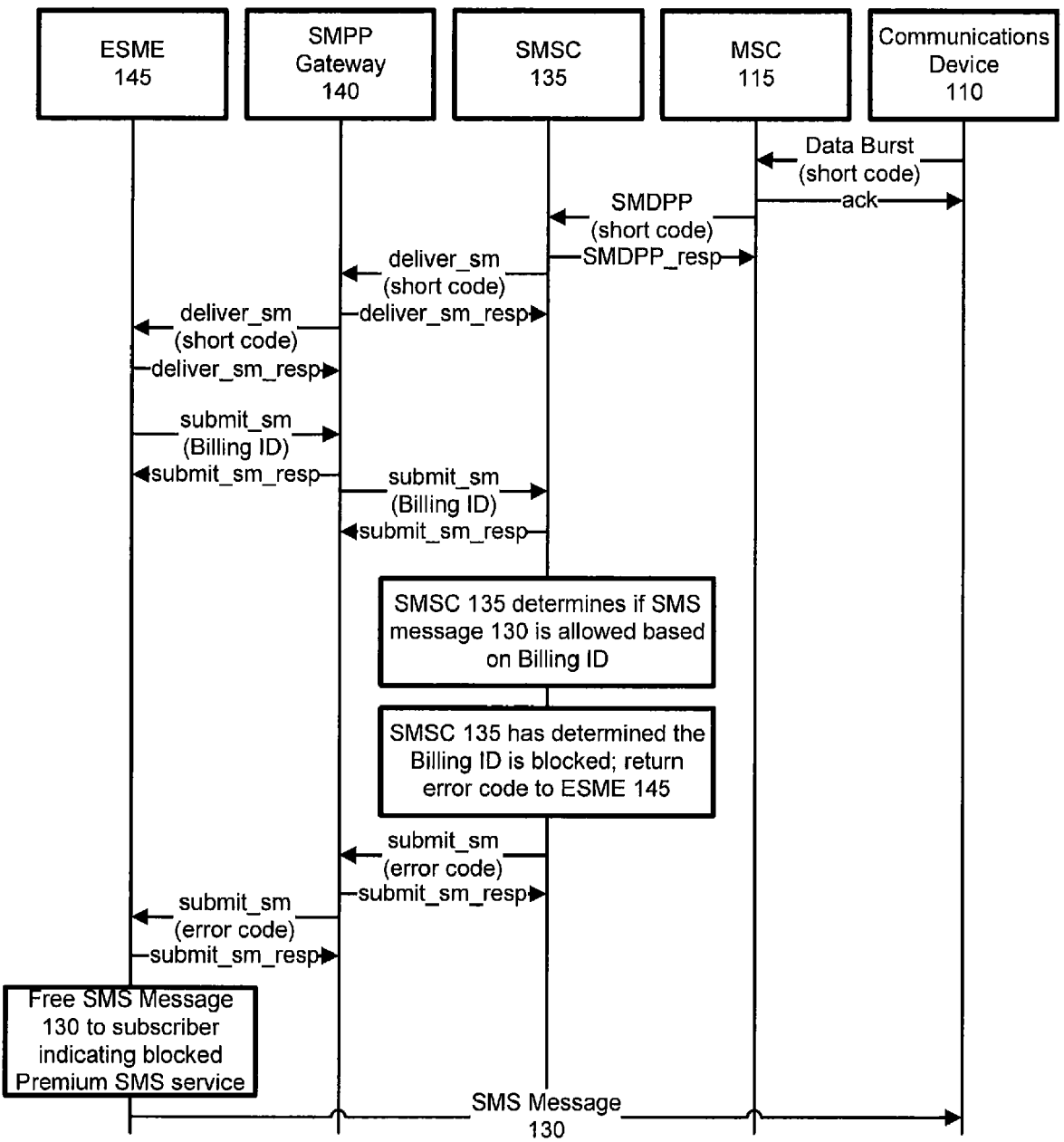
FIG. 6 illustrates an exemplary call/data flow diagram illustrating a mobile originate Premium SMS Opt-in Blocking Billing ID scenario.

FIG. 6 illustrates an exemplary call/data flow diagram illustrating a mobile originate Premium SMS Opt-in Blocking Billing ID scenario. The flow illustrates a mobile communications device 110 connected to a system, such as system 100 illustrated in FIG. 1, and requesting a Premium SMS message 130 through a process similar to the process 400 discussed above with regard to FIG. 4.

As illustrated in FIG. 6, a data burst (including a short code) may be sent from mobile communications device 110 to an MSC 115 under whose jurisdiction the mobile communications device 110 currently resides. The short code may, for example, have been entered into mobile communications device 1 10. The MSC 115 may send an acknowledgement message back to the mobile communications device 110 to inform it that the data burst was sent.

Next, a Short Message Service Delivery Point to Point (SMDPP) message may be sent from the MSC 115 to an SMSC/MR 135. This message may include the short code received from the mobile communications device 110. The SMSC/MR 135 may send an SMDPP_resp message back to the MSC 115 to indicate the SMDPP message was received, for example if the message from MSC 115 to SMSC/MR 135 specified a delivery receipt.

Next, the SMSC/MR 135 may send a deliver_sm SMPP message, (e.g., including the short code), to an SMPP Gateway 140. Generally, a deliver_sm message may be issued by an SMSC/MR 135 to send a message to an ESME 145. The SMPP Gateway 140 may send a deliver_sm_resp message back to the SMSC/MR 135.

Next, the SMPP Gateway 140 may in turn send a deliver_sm SMPP message, (e.g., including the short code), to an ESME 145. The ESME 145 may send a deliver_sm_resp message back to the SMPP Gateway 140.

Next, the ESME 145 may generate a Premium SMS message 130 based on the received short code. Generally, a submit_sm message (e.g., such as described above with regard to FIG. 2) may be used by an ESME 145 to submit a short message to an SMSC/MR 135 for onward transmission to a specified short message entity (e.g., communications device 110). The resultant message along with an associated Billing ID may thus be sent to the SMPP Gateway 140 though a submit_sm SMPP message. The SMPP Gateway 140 may send a submit_sm_resp message back in response to the ESME 145.

Next, the SMSC/MR 135 may determine if the Premium SMS message 130 received from the ESME 145 should be blocked. For example, a process similar to that discussed above with regard to FIG. 3 may be utilized. The SMSC/MR 135 may determine whether the Billing ID indicates to block the message or not. As illustrated in FIG. 6, the Billing ID may indicate the SMS message 130 is to be blocked, and as a result, the SMSC/MR 135 may send a submit_sm SMPP message back to the SMPP Gateway 140 including an error code and indicating that the Premium SMS message 130 will be blocked. The SMPP Gateway may then send a submit_sm_resp message back to the SMSC/MR 135 in response.

Next, the SMPP Gateway 140 may in turn send a submit_sm SMPP message, (e.g., including the error code), to the ESME 145. The ESME 145 may send a submit_sm_resp message back to the SMPP Gateway 140.

Next, the ESME 145 may send a free SMS message 130 (e.g., an SMS message 130 including a Billing ID indicating the message should be sent without charge) back to the mobile communications device 1 10. The free SMS message 130 may indicate, for example, that the subscriber is blocked from using Premium SMS services.

CONCLUSION

With regard to the processes, systems, methods, heuristics, etc. described herein, it should be understood that, although the steps of such processes, etc. have been described as occur-ring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    receiving a premium communications message from a network device, the premium communications message incurring a charge in addition to a cost of a standard communications message;
    determining a type of the premium communications message according to an identifier associated with the communications message;
    determining whether a subscriber is blocked from receiving the type of premium communications message based at least in part on the identifier; and
    selectively delivering the premium communications message to the subscriber based on the determination.

2. The method of claim 1, further comprising supplying a default type identifier if no type identifier is specified in the premium communications message.

3. The method of claim 1, wherein determining whether a subscriber is blocked further comprises:
    maintaining at least one range of identifiers;
    verifying the identifier against the at least one range of identifiers; and
    determining whether to block the premium communications message if the identifier is included in the at least one range of identifiers.

4. The method of claim 3, wherein the range of identifiers comprises a blacklist, and wherein the premium communications message is blocked if the identifier is included in the blacklist.

5. The method of claim 3, wherein the range of identifiers comprises a whitelist, and wherein the communications message is blocked if the identifier is not included in the whitelist.

6. The method of claim 3, wherein the identifier is at least one of a feature code and a billing identifier.

7. The method of claim 1, wherein determining whether a subscriber is blocked further comprises:
    accessing a subscriber account based at least in part on a subscriber identifier included in the premium communications message;
    determining a fee amount for delivery of the premium communications message based on at least one of the identifier, the subscriber account, a message type, and a time of day, the fee amount including the cost of the standard communication message and the charge in addition to the cost of a standard communications message;
    determining an account balance remaining in the subscriber account; and
    determining whether to block the communications message based on at least one of the account balance and the fee amount.

8. The method of claim 7, further comprising blocking the communications message if the account balance falls below a threshold value.

9. The method of claim 7, further comprising blocking the communications message if the account balance is less than the fee amount.

10. The method of claim 1, wherein the communications message is a Short Message Service message.

11. The method of claim 1, further comprising:
    receiving a request for a communications message from a subscriber, and forwarding the request to the network device.

12. The method of claim 11, further comprising addressing the request for a communications message to a short code telephone number.

13. The method of claim 1, further comprising, if the communications message is blocked:
    sending a message to the network device indicating the communications message is blocked;
    receiving a second communications message from the network device including an error message; and
    delivering the second communications message to the subscriber.

14. The method of claim 13, wherein the second communications message further comprises an identifier indicating to deliver the second communications message at no charge.

15. A method, comprising:
    receiving a communications message from a network device, the communications message including a subscriber identifier, a billing identifier, and message data;
    accessing a subscriber account based on the subscriber identifier;
    determining a fee amount for delivery of the communications message, the fee amount including a cost of a standard communication message and an additional premium communications message based at least in part on the subscriber account and the billing identifier;
    determining an account balance remaining in the subscriber account;
    comparing the account balance and the fee amount; and
    if the account balance is at least the fee amount:
        selectively delivering a premium communications message including the message data to the subscriber; and
        debiting the subscriber account by the fee amount.

16. The method of claim 15, further comprising delivering a communications message to the subscriber indicating insufficient funds if the account balance is less than the fee amount.

17. The method of claim 15, wherein the communications message is a Short Message Service message, and wherein the billing identifier indicates a premium Short Message Service with which the message is associated.

18. The method of claim 15, wherein the billing identifier is a feature code.

19. A system, comprising:
a communications network configured to provide communication services to a plurality of devices;
a communications device associated with a subscriber, wherein the communications device is connected to the communications network and configured to send requests and receive communications messages;
a network device configured to receive requests and selectively send communications messages, wherein the network device is connected to the communications network; and
a processing device connected to the communications network and including at least one processor and a non-transitory computer readable medium having instructions configured to cause the processor to:
receive a premium communications message from the network device, the premium message incurring a charge in addition to a cost of a standard communications message;
determine a type of the premium communications message according to an identifier associated with the communications message;
determine whether the subscriber is blocked from receiving the type of premium communications message based at least in part on the identifier; and
selectively deliver the premium communications message to the subscriber based on the determination.

20. The system of claim 19, wherein the processing device further comprises additional instructions to cause the processor to:
verify the identifier against at least one range of identifiers; and
determine whether to block the communications message if the identifier is included in the at least one range of identifiers.

21. The system of claim 19, further comprising a second network device connected to the communications network and configured to selectively store and retrieve at least one subscriber account, wherein the processing device further comprises additional instructions to cause the processor to:
access a subscriber account based at least in part on the identifier;
determine a fee amount, the fee amount including the cost of a standard communication message and a charge in addition to the cost of a standard communications message based on at least one of the identifier, the subscriber account, a message type, and a time of day;
determine an account balance remaining in the subscriber account; and
determine whether to block the communications message based on at least one of the account balance and the fee amount.

22. The system of claim 21, wherein the fee indicates a cost for delivery of the communications message to debit from the subscriber.

23. The system of claim 21, wherein the processing device further comprises additional instructions to cause the processor to block the communications message if the account balance falls below a threshold value.

24. The system of claim 21, wherein the processing device further comprises additional instructions to cause the processor to block the communications message if the account balance is less than the fee amount.

25. The system of claim 21, wherein the network device is a billing system, and wherein the identifier is at least one of a mobile device number and a feature code.

* * * * *